J. KINDERVATER.
METHOD OF MAKING U-SHAPED PIPE BENDS.
APPLICATION FILED JULY 8, 1914.
1,138,228.
Patented May 4, 1915.
2 SHEETS—SHEET 1.
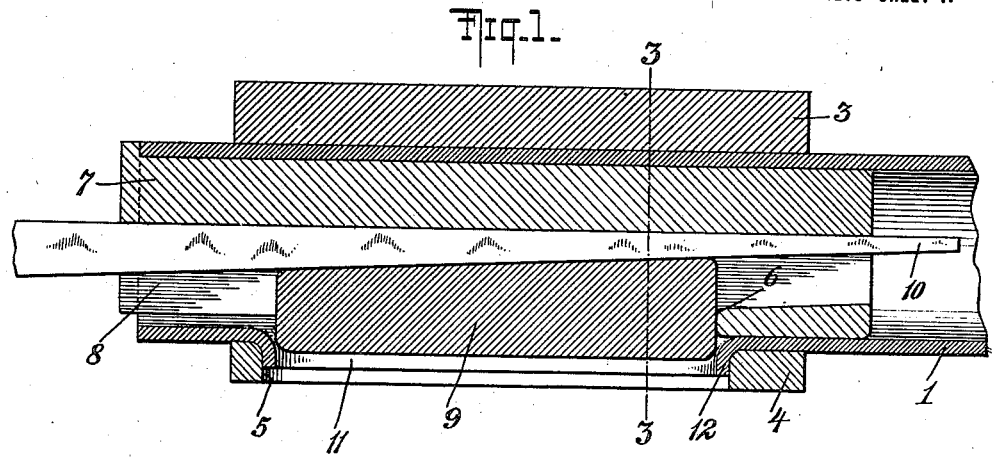
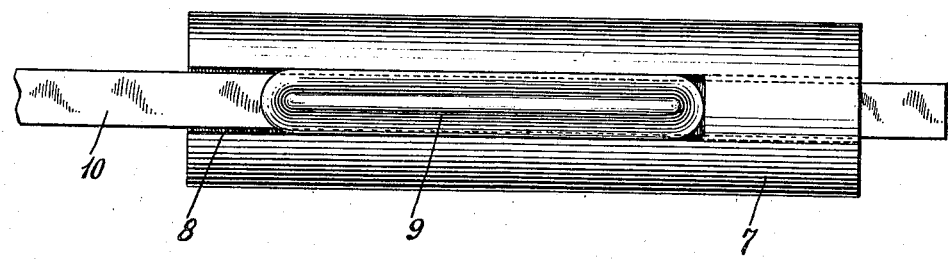
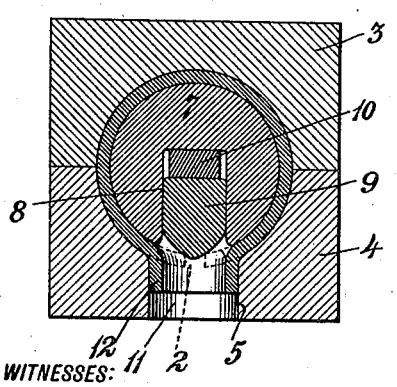
WITNESSES:
INVENTOR
BY
ATTORNEYS

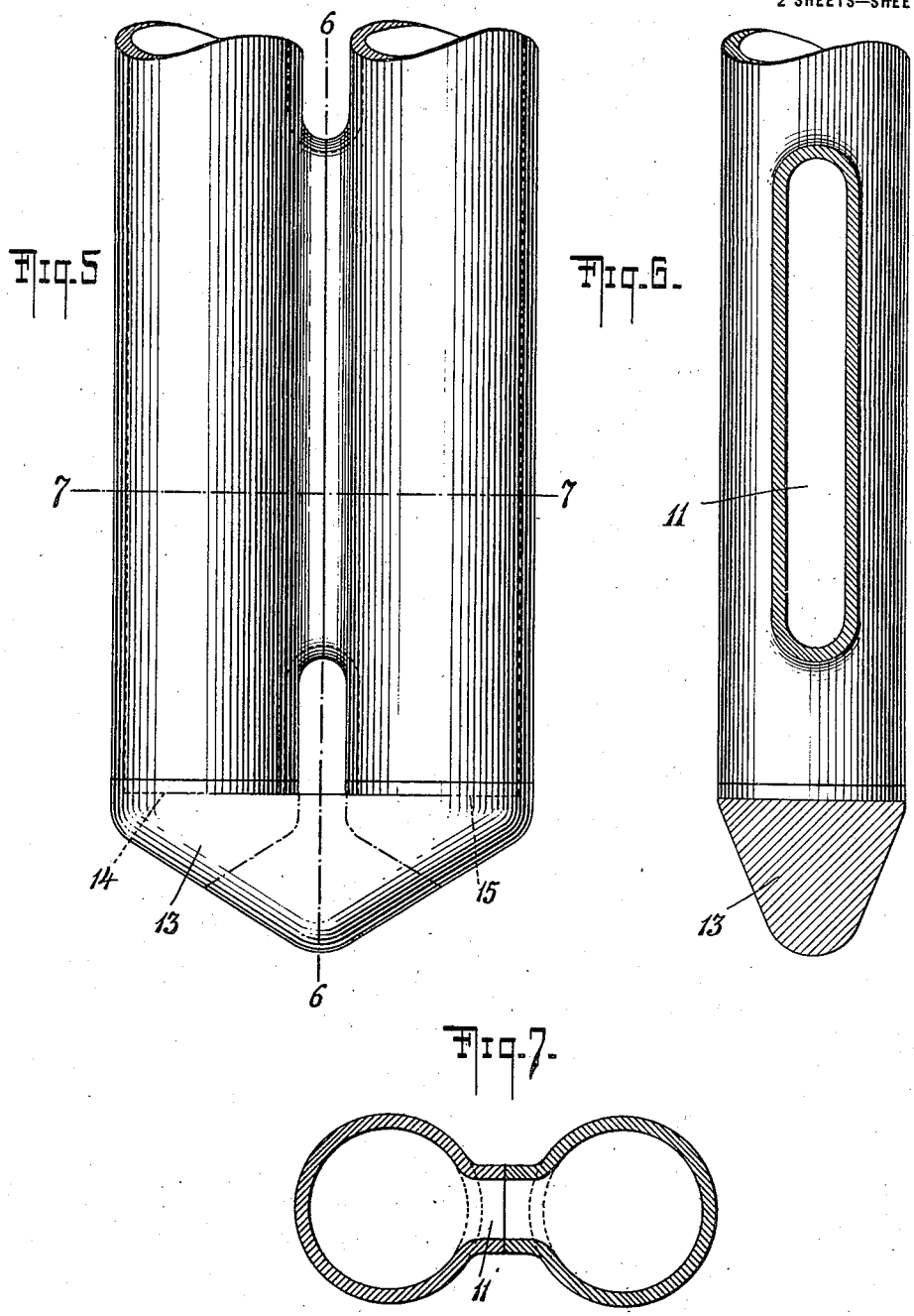

UNITED STATES PATENT OFFICE.

JULIUS KINDERVATER, OF RICHMOND, VIRGINIA, ASSIGNOR TO LOCOMOTIVE SUPER-HEATER COMPANY, OF NEW YORK, N. Y., A CORPORATION OF DELAWARE.

METHOD OF MAKING U-SHAPED PIPE-BENDS.

1,138,228.      Specification of Letters Patent.      Patented May 4, 1915.

Application filed July 8, 1914. Serial No. 849,678.

*To all whom it may concern:*

Be it known that I, JULIUS KINDERVATER, a citizen of the United States, and a resident of Richmond, county of Henrico, State of Virginia, have invented a certain new and useful Improvement in a Method of Making U-shaped Pipe-Bends, of which the following is a specification.

My invention concerns the making of U shaped pipe bends and particularly such bends when used in connection with boilers, superheaters and generally when exposed to high temperatures or to carry steam or fluid under pressure. My invention may, however, be utilized to advantage in making pipe bends of the class referred to even though such pressure and temperature conditions are absent.

Various ways of making bends of the above character for similar purposes have been proposed. The present invention comprises a method which, as contrasted with known methods is of extreme simplicity, involve only very simple tools and dies, can be carried out by comparatively unskilled workmen, and involves very little waste of material.

The object of my invention is to provide a pipe bend of the character specified which may be simply, easily and economically manufactured as aforesaid; which shall not involve any undue stretching or strain of the pipe walls at any point, and which shall be adapted to withstand high pressures and high temperatures when used under such high pressure and high temperature conditions.

My invention will be better understood by referring to drawings, in which—

Figure 1 represents a central axial section through a pipe length and dies as the same are positioned to expand and shape the opening at the side of the end of the pipe, as will hereafter be described; Fig. 2 is a plan view, taken from below, of Fig. 1; Fig. 3 is a section, taken along the line 3—3, of Fig. 1; Fig. 4 is a perspective view of the end cap used in the preferred form of bend made according to my invention; Fig. 5 is a plan view of a complete pipe bend, in its preferred form, made according to my invention; Fig. 6 is a section taken along the line 6—6 of Fig. 5; and Fig. 7 is a section taken along the line 7—7 of Fig. 5.

Referring to the drawings, the end of a pipe 1, which is to be united to a similar pipe by a pipe bend according to my invention, is first provided with a narrow axial slot 2 (shown dotted, Fig. 3) on one side; this slot begins a short distance from the end proper and has a length, preferably, of two and a half or three times the pipe diameter so as to assure an ample section across the bend to be formed for the passage of the steam or other fluid, as will hereinafter appear. This slot may easily be made with the aid of a small milling cutter or by a planing cut. The pipe end is then gripped, slot 2 downward, between a pair of clamping dies 3, 4, each of which is grooved to correspond with one half the cross section of the pipe. The lower die 4 is provided with a central slot 5 which extends beyond slot 2 at each end by an amount substantially equal to the thickness of the pipe wall and has a width substantially equal to the width (outside) which it is desired to give to the connection between the pipes when the bend is completed; the ends of the slot are rounded as are also the edges where the slot opens into the groove of the die. A mandrel 7 fits easily within the bore of the pipe and has a slot 8 on its lower side which extends from its outer end to a point 6 coincident with the end 6 of slot 2 in the pipe wall; the width of slot 8 is substantially that of slot 5 less twice the wall thickness of the pipe. A rectangular opening or spreading die 9, the bottom of which has the form of a sharpened wedge and the top of which is inclined with respect to the top of slot 8, is then inserted in said slot and dropped with its wedge shaped edge in slot 2 of the wall of the pipe (Fig. 3). A wedge 10 is then entered between the opening die 9 and the adjacent wall of mandrel 7 and driven home in any suitable manner. As the wedge 10 is driven in, the sharp lower edge of opening die 9 is forced into slot 2 of the pipe wall which is thereby thrown outwardly so as to form an elongated opening 11 bounded by flanged walls 12. These walls are then faced off parallel to the axis of the pipe and mandrel and dies removed. A pair of pipes 1, having had openings 11 formed therein, as just described, is arranged parallel to one another with the flanged edges 10 abutting. These abutting edges are then welded together in any suitable manner, preferably electrically. A cap 13 (Fig. 4), preferably drop-forged, solid and countersunk at 14, 15 to receive the two open ends of the two pipes, is then placed into position (Figs. 5 and 6) and welded fast to said pipes, thus sealing them.

The length of slot or opening 11, as also the width, may be varied within reasonable limits to provide a cross sectional area of bend of any desired amount. By having the slot formed a short distance away from the extreme end of the tube, welding of the cap 13 to the tube ends is considerably simplified since there is merely the question of welding the two tubular ends into corresponding recesses which are readily countersunk in a lathe or drill press. If I desire, however, I may so position this slot that it is open clear through to the end of the pipe; in such case the contour of the united pipe ends to which a cap is to be united will be about as shown in Fig. 7, and the countersinking of the cap is rendered correspondingly more difficult. I may, however, dispense with the countersinking and weld the flat surface of the face directly to the tube ends if I prefer.

In the form first described (Figs. 5 to 7) I may, instead of using the solid cap with two countersinks, (Figs. 4, 5 and 6) merely use two independent conical caps each one of which is independently countersunk and welded to one tube end. This construction is indicated by the dotted lines of Fig. 5.

Variations of detail may be made within the spirit of my invention as defined by the following claims.

I claim—

1. The method of making U shaped pipe bends which comprises applying pressure to the inner side of the pipe wall so as to form an opening therethrough bounded by a continuous closed flange abutting and welding said flanges of two pipes together, and then closing the ends of the joined pipes.

2. The method of making U shaped pipe bends which comprises applying pressure to the inner side of the pipe wall so as to form an opening therethrough bounded by a continuous closed flange, abutting and welding said flanges of two pipes together, and then welding a cap to the adjacent end of the joined pipes.

3. The method of making U shaped pipe bends which comprises applying pressure to the inner side of the pipe in a region extending axially, ending before the pipe end is reached, and of limited length so as to form an opening therethrough bounded by flanges, abutting and welding said flanges of two pipes together, and then welding a solid cap to the open end of each pipe.

4. The method of making U shaped pipe bends which comprises applying pressure to the inner side of the pipe in a region extending axially, ending before the pipe end is reached, and of limited length so as to form an opening therethrough bounded by flanges, abutting and welding said flanges of two pipes together, and then providing a solid cap countersunk to correspond with the pipe end and welding the same thereto.

5. The method of making U shaped pipe bends which comprises making a narrow longitudinal slit in the pipe wall beginning at a limited distance from one end and before the pipe end is reached, applying pressure from within the pipe to the edges of said slit so as to expand and spread them and form an opening through the pipe bounded by flanges, abutting and welding said flanges of two pipes together, and then welding a solid cap to the open end of each pipe.

In testimony whereof I have hereunto set my hand in the presence of two subscribing witnesses.

JULIUS KINDERVATER.

Witnesses:
JNO. S. AGNEW,
L. E. DINGMAN.